Figure 4:
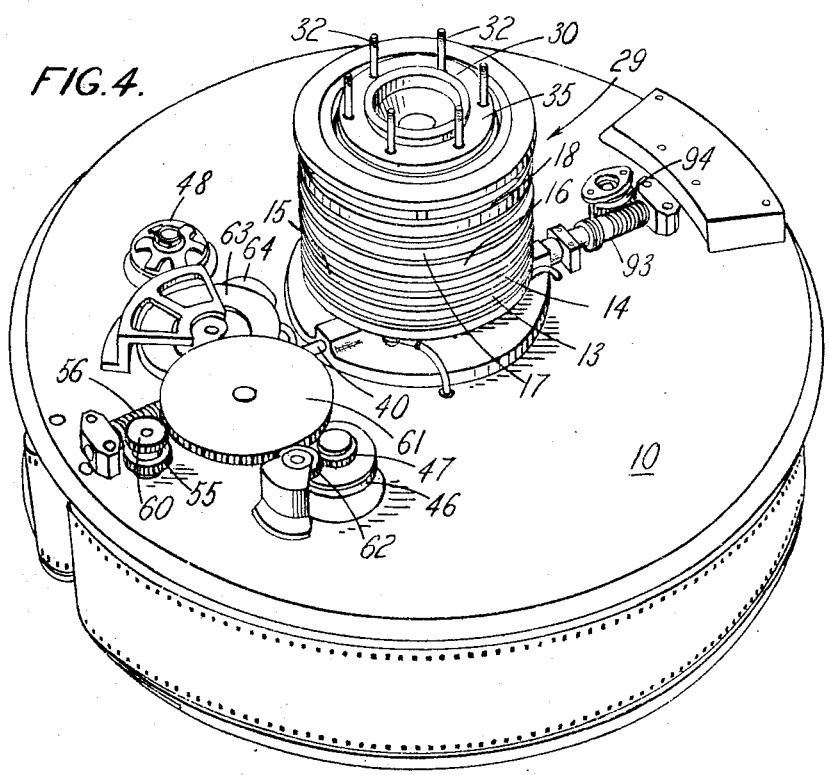

March 17, 1959  F. C. DICKINSON  2,878,094
METHODS AND APPARATUS FOR RECORDING ELECTRICAL
AND MECHANICAL VIBRATIONS
Filed April 8, 1954  3 Sheets-Sheet 1
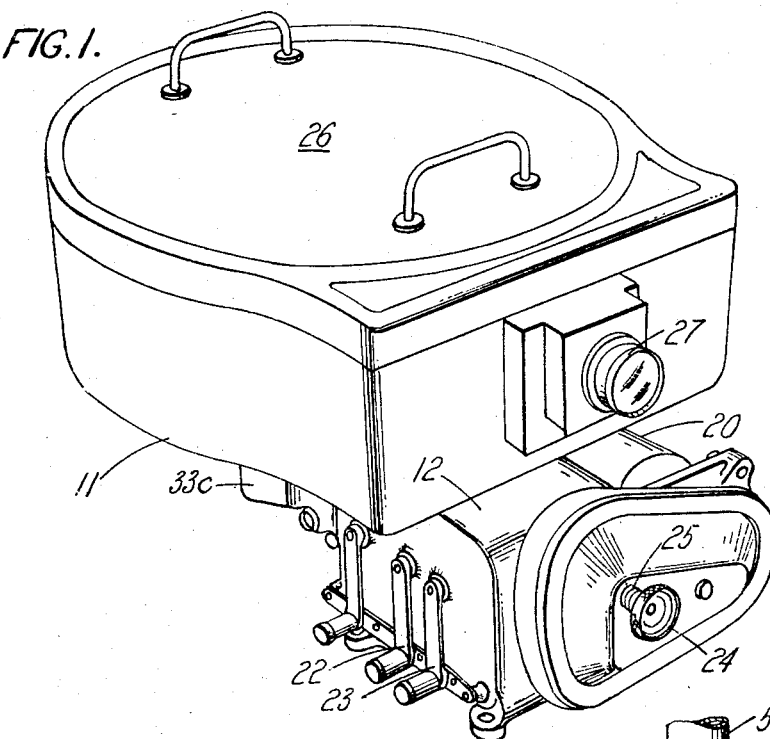
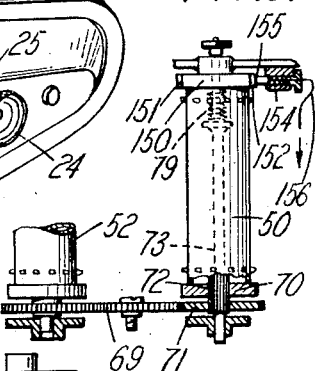
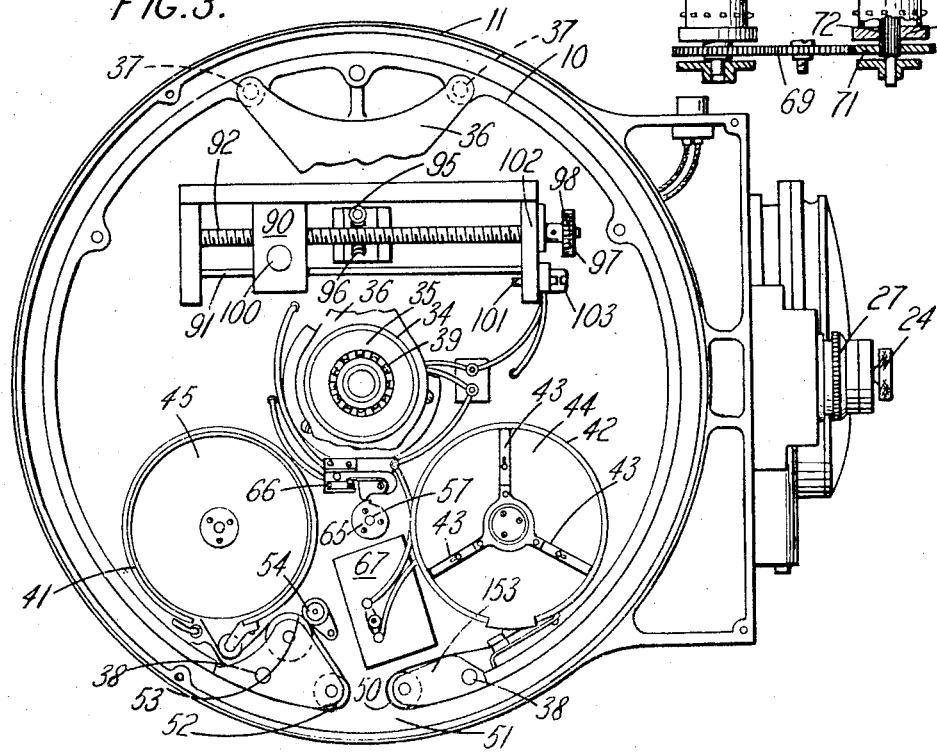

March 17, 1959

F. C. DICKINSON 2,878,094

METHODS AND APPARATUS FOR RECORDING ELECTRICAL
AND MECHANICAL VIBRATIONS

Filed April 8, 1954

3 Sheets-Sheet 2

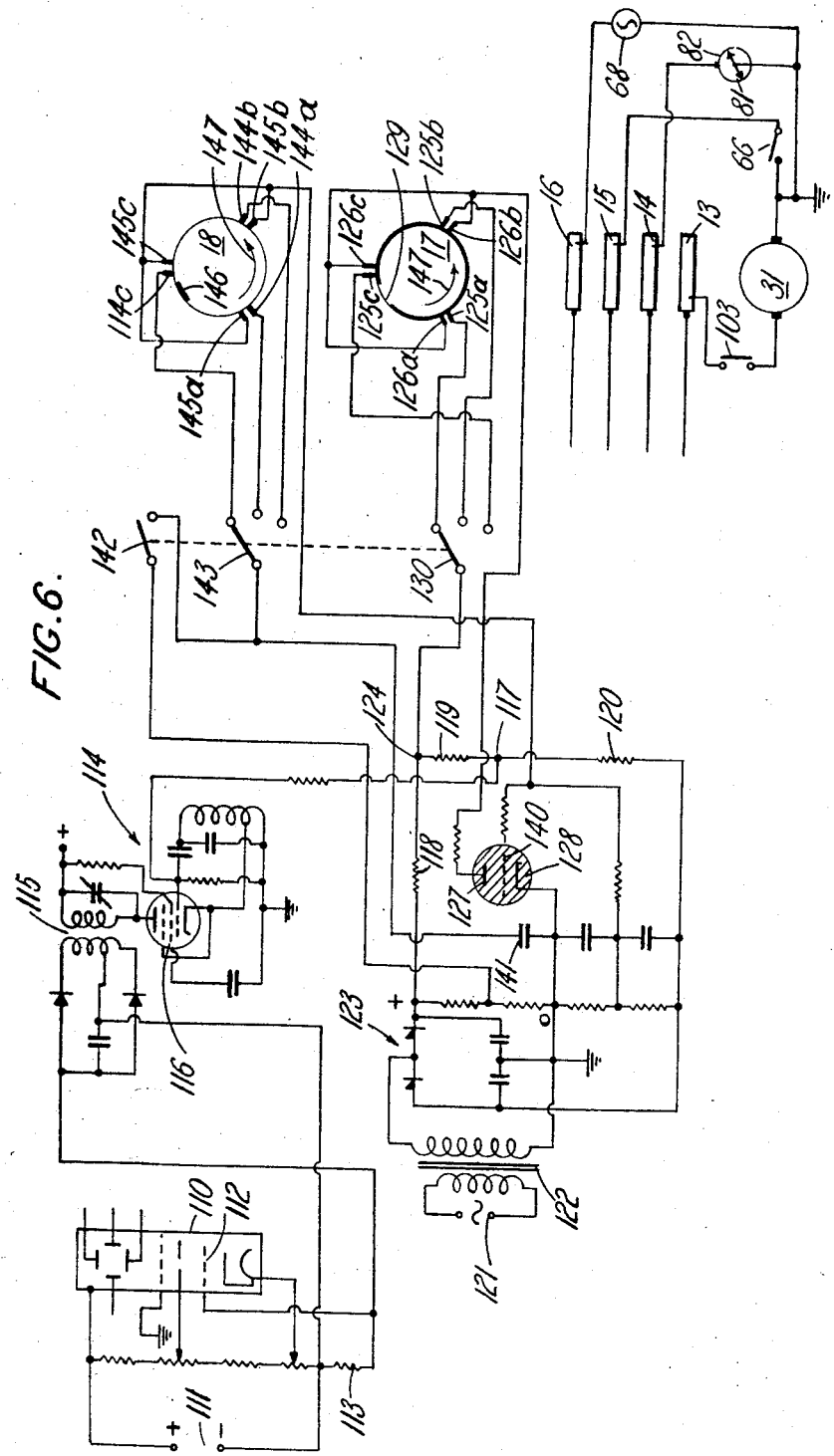

United States Patent Office 2,878,094
Patented Mar. 17, 1959

2,878,094

METHODS AND APPARATUS FOR RECORDING ELECTRICAL AND MECHANICAL VIBRATIONS

Frank Clifford Dickinson, Gloucester, England, assignor to Rotol, Limited, Gloucester, England, a British company Application April 8, 1954, Serial No. 421,785

Claims priority, application Great Britain April 9, 1953

10 Claims. (Cl. 346—107)

This invention comprises improvements in or relating to methods and apparatus for recording electrical or mechanical vibrations.

For recording electrical or mechanical vibrations it is known to cause a light source to move rectilinearly as a function of the amplitude of the vibration and to form an image of the light source upon a strip of light sensitive material which is passed lengthwise through the image position at a steady speed in a direction at right angles to the direction of movement of the image. A wave form trace is thus formed upon the light sensitive material recording the characteristics of the vibration.

Where very high frequency vibrations of the order of 15 kilocycles per second for example have to be recorded, difficulty arises in moving the strip material at a sufficiently fast and uniform speed to obtain sufficient spacing between the wave peaks to make the recording usefully decipherable. Thus, to record a frequency of 20 kilocycles per second, and to obtain a spacing of 0.05 inch between wave peaks, the strip material would have to move at a speed of 1000 inches per second, which is approximately ten times the maximum film speed of an ordinary moving-picture camera.

The force which can be imparted to the strip material to move the material, for example, through edge perforations as is the case of a film in a moving-picture camera is strictly limited by the strength of the strip material and it follows that if the strip material has to be accelerated to working speed before each exposure, and afterwards, brought to rest, the acceleration and retardation times will be considerable and will represent a substantial wastage of the material.

It would, of course, be possible to allow a separate length of strip material to pass through the image plane for each recording, but such a method would be very inconvenient since it is usually necessary to make a number of recordings in rapid succession, each recording covering a length of about 15 inches for example. The handling, processing and storage of such short lengths would also give rise to considerable inconvenience.

The present invention overcomes this difficulty by providing a method of recording electrical or mechanical vibrations, which method comprises causing a light source to move rectilinearly as a function of the vibrations and forming an image of the light source upon a strip of light sensitive material moving through the image position at a steady speed in a direction at right angles to the direction of movement of the image, characterised in that a length of light sensitive strip material is repeatedly passed lengthwise through the image position, and the exposure of the strip to the light source is so controlled that a recording is made upon at least a lengthwise portion of it during only one pass of said length of the strip material through the image position. The term "image position" as used herein is intended to include the whole width of the film.

The exposure of the strip of light sensitive material to the light source may be so controlled that recordings are made upon different lengthwise portions of said length of strip material during different passes of it through the image position.

Only one recording may be effected on the length of strip material during any one pass of it through the image position and the whole of the strip of light sensitive material may be repeatedly passed through the image position. When the strip to be used is long, however, it is inconvenient to pass the whole of it repeatedly through the image position and it is preferred that successive lengths of the strip of light sensitive material are each repeatedly passed one at a time through the image position so that first one length is passed repeatedly through the image position and then a successive length is passed repeatedly through the image position, and wherein a number of different lengthwise portions of each successive length are exposed to the light source during separate passes of each successive length through the image position.

Alternatively, however, successive lengths of the strip of light sensitive strip material may be each repeatedly passed one at a time through the image position so that one length is repeatedly passed through the image position and then a successive length is repeatedly passed through the image position, and the exposure of the strip of light sensitive material to the light source may be so controlled that a recording is effected upon the whole of each successive length of the strip material during one such pass of it through the image position.

The present invention also provides apparatus for recording, in wave form, an image of a light source caused to move rectilinearly as a function of the amplitude of electrical or mechanical vibrations.

According to the present invention such apparatus comprises a stationary optical system arranged to form a real image of the light source, motive means for repeatedly passing a length of light sensitive strip material lengthwise through the image position at right angles to the direction of displacement of the image resulting from the movement of the light source, and control means co-operating with said motive means to control the exposure of the strip to the light source so that a recording is made upon at least a lengthwise portion of said length of the strip during only one of its passages through the image position.

In a construction of apparatus according to the invention, for carrying out the preferred method in which a number of successive lengths of the strip of light sensitive material are each repeatedly passed through the image position one at a time and exposed as to their whole length during one such pass only, or a number of lengthwise portions of them are exposed each during a different pass of the length, the optical system is arranged to form a real image of the light source upon the periphery of a drum which is provided internally with means for carrying a spool of unexposed light sensitive strip material, and wherein the apparatus further comprises means for guiding the strip material from the spool through a slot in the periphery of the drum, around the drum periphery, and back through the same or a different slot in the periphery of the drum, a feed device arranged to grip and advance the strip to replace a length thereof which lies around the periphery of the drum with a successive length thereof as and when required, and winding means for driving the feed device and a take-up spool for exposed strip material.

Figure 2:
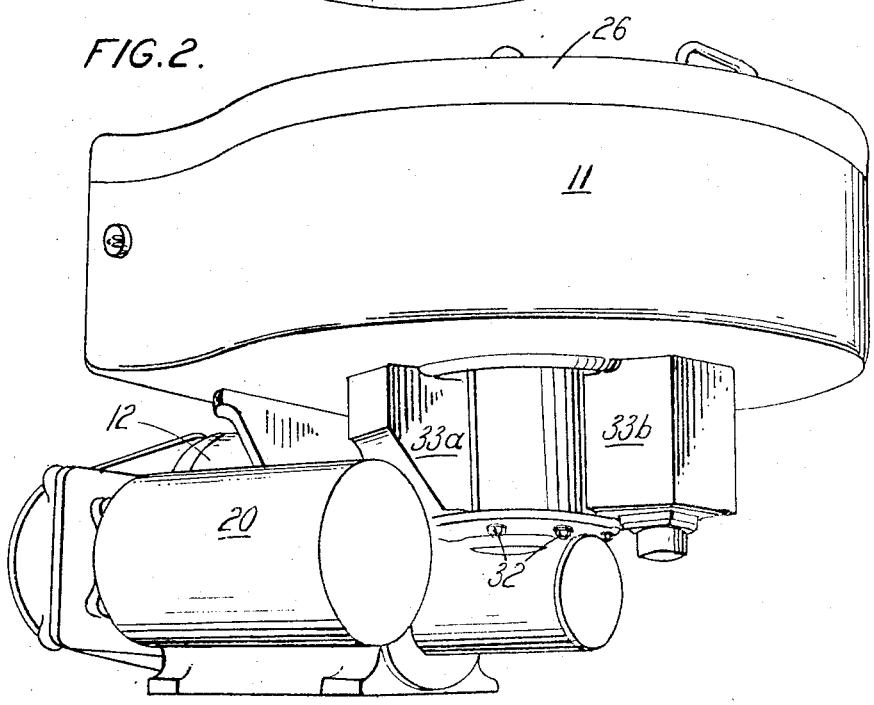

One method and apparatus in accordance with the present invention will now be described by way of example with reference to the accompanying drawings whereof:

Figure 1 is a perspective view, from above and to one side, of a camera having a rotatable strip-supporting drum, Figure 2 is a perspective view, from below and to the other side of the camera shown in Figure 1, Figure 3 is a plan view of the camera shown in Figures 1 and 2 with the top cover plate of the camera removed, showing the rotatable drum, Figure 4 is a perspective view of the drum in an inverted position, Figure 5 is a front elevation, partially in section, showing a detail of the construction of the camera, and Figure 6 is a wiring diagram showing the control means.

Referring to Figures 1, 2 and 3, the camera comprises a drum 10 enclosed within a casing 11 and driven through a gear box 12 by an electric motor 20. The gear box 12 is provided with three levers 21, 22 and 23 by means of which any one of five different gear ratios may be selected corresponding to drum periphery speeds of 50, 100, 250, 500 and 1000 inches per second for normal operational speed of the motor, it being understood that in use an appropriate ratio is selected according to the approximate frequency of the vibrational data to be recorded. A knob 24 pressable against the pressure of a spring 25 into dog clutch engagement with the gearbox primary shaft enables the latter to be turned by hand to facilitate engagement of the gear wheels and toothed clutches comprising the gear change system.

A detachable cover 26 provides access to the drum, and an optical system 27 is arranged to form, at the periphery of the drum, images of light sources constituted by points of light formed on the screens of an assembly of cathode ray tubes arranged in front of the camera. Conveniently, with a single optical system 27 as shown, and using standard 70 mm. light sensitive film as the strip material around the drum, three cathode ray tubes can be arranged one above the other together with a neon tube arranged to flash at predetermined time intervals. Three wave form records and a time base signal are thus recorded side by side across the width of the film.

In a modified arrangement two wide angle optical systems may be provided, each seeing the screens of two cathode ray tubes, and one narrower angle system seeing the neon tube for the time base signals. In this way, four vibration records and one time base record can be recorded side by side across the width of the film.

Referring to Figure 4 the drum 10 is provided with a downwardly projecting hub portion generally indicated at 29 carrying on its outside four slip rings 13, 14, 15, 16 and two contact rings 17, 18 respectively, which form part of first and second switch means which are later described. Internally, the hub 29 is provided with two ball bearings the inner races of which are carried by a hollow shaft 30 provided with a flange 35 which is secured to the casing 11 by bolts 32 (see Figure 2). Inside the shaft 30 is arranged a driving shaft (not shown) which is splined to the hub above the upper bearing and carries at its lower end a bevel gear meshing with a bevel gear on the output shaft of the gear box 12. Around the hub 29 the casing 11 is provided with three compartments 33a, 33b and 33c (see Figure 2) each housing brushes cooperating with the slip rings 13, 14, 15, 16 and contact rings 17, 18 as will be more fully described.

Projecting upwardly from the base of the drum is a sleeve 34 (see Figure 3) in which is housed a film winding motor 31. The upper end of the motor is centralised by the bridge piece 36 which is shown broken away for the sake of clarity and which has dowel pegs 37 engaging holes 38 at the periphery of the drum 10, and carries a taper roller bearing 39 the outer race of which is mounted inside the cover 26, this arrangement providing an additional steady bearing for the drum 10. The winding motor shaft projects downwardly to drive a worm carried in the hub 29 and meshing with a wormwheel mounted on a transverse shaft 40 journalled on the drum (see Figure 4).

Two film spool boxes 41 and 42 (see Figure 3) are provided in the drum 10 and have detachable covers such as 44 adapted to be locked in place by toggle-action detents 43. In Figure 3, the cover is shown removed on the left hand spool box 41 to reveal a film take-up spool 45. At its lower end the take-up spool 45 for exposed film is in dog-clutch engagement with a spindle extending through the bottom of the drum 10 to a spring loaded slipping clutch 46 (see Figure 4) provided on its driving side with a gear wheel 47, the clutch 46 being provided so that the spool 45 may slip in relation to its drive as the film grows. Rotation of a similar spindle for the spool for unexposed film in the box 42 is restrained by a friction device 48 to prevent over running of the unused film spool.

Unexposed film from the spool within the box 42 is led over a toothed guide roller 50 journalled in the drum, through a slot 51 in the peripheral wall of the drum 10 around the outside of the drum, back through the slot 51, over a toothed guide roller 52 and a toothed traction roller 53, both journalled in the drum, to the take-up spool 45. If desired, the guide rollers 50, 52 may be positioned each in a separate slot 51 instead of one at each side of a single slot 51, in which case, the film is led out through one slot and back through the other. A pressure roller 54 holds the film against the traction roller to prevent slipping. The shaft of the traction roller 53 extends through the bottom of the drum 10 and is provided with a wormwheel 55 (see Figure 4) meshing with a worm 56 on one end of the transverse shaft 40. A spur gear 60 also on the shaft of the roller 53 drives the gear 47 of the spool 45 through idler gears 61 and 62. A further gear secured to the gear 61 drives a reduction train 63, 64 to rotate a shaft 57 carrying within the drum a cam element 65 (see Figure 3) operating normally closed switch contacts 66 connected in series with the winding motor 31. The gearing is arranged so that one revolution of the cam 65 corresponds to replacement of one length of film around the drum 10 by a fresh length, the contacts 66 being then opened to stop the film winding motor 31 which is supplied with current through the slip rings 13 and 15 (see Figure 6). A manually operable switch is also provided in known manner to start the motor 31 when the contacts 66 are open. The shaft 57 also carries an eccentric (not shown) which actuates a counting device in a box 67. By means of a small lamp 68 (see Figure 6) and an optical system also in the box 67 the number shown by the counting device may be photographed upon the film when the lamp is illuminated by a circuit established through the slip ring 16, when a fresh length of unexposed film has been positioned round the drum.

To minimize the wrapping friction which occurs between the film and the periphery of the drum 10 when winding the film, the toothed guide rollers 50 and 52 are geared together with the interposition of an idler gear 69 (see Figure 5) so that a predetermined amount of slackness is maintained in the film loop. Loading of the film and adjustment of the amount of this slackness is facilitated by a clutch device generally indicated at 70 which may be operated to disconnect the roller 50 from its gearwheel 71 and re-engage it with a fine degree of angular adjustment. For this purpose, the roller 50 is made hollow and provided with finely cut internal splines at its lower end to receive a correspondingly splined portion 72 of a shaft 73 extending downwardly through the roller into splines in the gearwheel 71. At its upper end the shaft 73 is provided with a knob 80 by means of which it may be raised against the action of a spring 79 to withdraw the splined part 72 of the shaft 73 from the splines in the gearwheel 71. The roller 50 carries on its upper flange an insulated ring 150 having two diametrically opposed contacts 151 and 152 which are connected to the body of the roller which is then connected to the negative side of a source of potential. Fitted under the top support bearing plate 153 is an insulated brush carrier 154, carrying a spring-loaded copper-carbon brush 155 which bears on the insulated ring 150. The brush 155 is provided with a flexible pig-tail 156 which is connected to slip ring 14 and thus to an external indicator so that each revolution of the roller 50 causes two impulses to be transmitted to the indicator, the indicator then showing the number of half revolutions of the roller during each film wind relative to the drum. If after a wind the indicator shows a number of revolutions which is inconsistent with the length of film which should have been wound, it is evident that a fault has occurred which should be investigated before continuing to make recordings. Such a fault may be due to breaking of the film or tearing of the perforations. By providing the film with suitable leading and trailing portions the camera is made daylight loading.

To maintain the drum in balance as film is transferred from one spool to the other a balance weight 90 is moved along a guide bar 91 by means of a lead screw 92 driven from the transverse shaft 40 through two worm reduction gears 93, 94 (see Figure 4) and 95, 96 and spur gears 97, 98. A knob 100 associated with a spring loaded plunger serves to release the weight 90 from driving engagement with the lead screw so that when reloading the camera it may be moved back to its starting position. In this position, the centre of gravity of the weight 90 lies on the same diametral line as the driving spindle for the unexposed film spool in the box 42 but on the opposite side of the axis of rotation of the drum 10, and the weight in this position provides a counterbalance moment about the axis of rotation of the drum 10 equal to that of the unexposed film. The gearing 93, 94, 95, 96, 97 and 98 is so arranged that when the film has been wholly transferred to the spool 45 the centre of gravity of the weight 90 again lies diametrically opposite the new centre of gravity of the film and the weight 90 again provides an equal balancing moment. It can be shown that with this arrangement balance is also maintained during the transition from one state to the other. To ensure that possible overrunning of the film winding motor 31 does not damage the lead screw 92 or the corresponding threads on the mass 90 owing to the latter running against the supporting block 102, a member 101 sliding in the supporting block 102 is arranged to separate electrical contacts 103 in the winding motor circuit when its end is engaged by the mass 90.

As already described, the slip rings 13, 14, 15 and 16 serve for the transmission of electrical current to and from the drum 10 for the operation of the film winding motor 31 and auxiliary apparatus, the rings each cooperating for this purpose with three brushes connected together in parallel and arranged one in each of the three casing compartments 33.

The first and second switch means comprising contact rings 18 and 17 respectively are employed in a control system to control the exposure of the film by controlling respectively the lighting up and extinction of the cathode ray tubes so that successive recordings take place on different lengthwise portions of the length of film lying around the periphery of the drum 10, the cathode ray tubes being lit at the beginning of one passage of each lengthwise portion through the image position and extinguished at the end of the one passage. In this particular case, the arrangement provides for three sets of recordings to be made upon each such length of film, each on one lengthwise portion of the length, that is to say, for each movement of the film relatively to the drum, although it will be understood that the arrangement which will be described may be adapted for two sets of recordings for each length of film round the drum, or a reasonable number more than three, or just one set of recordings.

The control system is shown in Figure 6 and is common to all the cathode ray tubes, but to avoid complications only one tube 110, is shown. The tube is operated from an E. H. T. source 111 and has a control grid 112 connected across a resistance 113. By creating a potential drop across the resistance 113 to make the control grid 112 sufficiently negative, the cathode ray beam may be suppressed and the light source extinguished. For this purpose a single valve self-excited oscillator 114 is provided to produce radio frequency current which is passed through heavily insulated transformer 115 and rectified to produce an output completely isolated from earth which is sufficient to provide the required voltage drop across the resistance 113 to extinguish the cathode ray beam. The oscillator operates so long as its control grid 116 is maintained at a suitable negative potential. This negative potential is obtained from a tapping point 117 in a network comprising resistance 118, 119 and 120 supplied from an outside source 121 through a transformer 122 and a rectifying system 123. Operation of the oscillator 114 is stopped during the period when the cathode ray tube is required to operate by allowing an increased current to flow through the resistance 118 to make the control grid 116 sufficiently more negative. This is achieved by arranging a circuit from the point 124, through a switch part in the form of a brush 125 (a, b, or c) on the contact ring 17, back through another closely adjacent switch part in the form of a brush 126 (a, b, or c) to the anode 127 of a thyratron or the like gas filled electronic valve 128. The contact ring 17 and the brushes 125 (a, b, or c), 126 (a, b, or c) together form relatively movable switch parts of the second switch means for controlling the extinction of the cathode ray tubes. Since the contact ring 17 is carried by the drum this part of the second switch means moves relatively to the other part of the second switch means, namely the brushes 125 (a, b, or c), 126 (a, b, or c), in synchronism with the movement of the length of film round the drum through the image position. When the thyratron 128 is conducting the anode current of the thyratron flows through the resistance 118 stopping the oscillator 114. The contact ring 17 is of electrically conducting material so that each second switch means is normally closed, but the ring 17 is provided with an island 129 of electrically insulating material of a length sufficient to bridge the brushes 125 (a, b, or c) and 126 (a, b, or c), and when this bridges the brushes of a pair (a, b, or c) the second switch means operates and the anode circuit of the thyratron is broken so that the oscillator 114 re-commences and the cathode ray beam is switched off. The three pairs of brushes 125, 126 are housed in the casing compartments 24 (a, b, and c) and thus provide the three points in the rotation of the drum at which exposure of the film ceases. Operation of a selector switch 130 determines which pair of brushes 125, 126 shall be effective at a given time. Illumination of the cathode ray tubes to start the exposure is brought about by applying a positive potential to the grid 140 of the thyratron so that the latter "fires" and stops the oscillator 114. For this purpose, condenser means comprising a condenser 141 which has been positively charged by closing and re-opening a switch 142, and which is in an ignition initiating control circuit for the thyratron, is connected to the grid 140 through a selector switch 143 and one of three pairs of brushes 144, 145 (a, b, and c), forming a switch part of the first switch means, these being arranged round the contact ring 18 which forms the part of the first switch means movable in synchronism with the film length round the drum, the ring 18 being made of electrically insulating material so that the first switch means is normally open, but having a conducting island 146 of a length sufficient to bridge the pairs of brushes 144, 145 (a, b, and c). Thus when the island 146, travelling in the direction of arrow 147, connects the brushes of the selected pair 144c, 145c the first switch means operates, the thyratron 128 fires, and exposure starts and continues until the island 129 also travelling in the direction of arrow 147 open circuits the selected pair of brushes 125a, 126a, the drum having turned through approximately one third of a revolution during this time. Before another exposure is made the selector switches 130, 143 must be adjusted to a new position. On operation of the switch 142 the condenser 141 is charged and exposure starts at the next passage of the island 146 past the selected brushes 144, 145. After three exposures winding of the film relatively to the drum is necessary, to bring a fresh length of unexposed film around the drum periphery and this is done by closing the manually operable switch to start the winding motor 31, the motor being automatically stopped by the switch 66 when the length of film round the drum has been replaced by a successive length.

It will now be appreciated that the number of pairs of brushes 125, 126 and 144, 145 arranged round the contact rings 17 and 18 determines the number of exposures which may be made between winding on the film and that this number may vary from one to a reasonable number more than three according to the size of the drum and the length of the records required.

With the apparatus described the length of film around the drum 10 passes repeatedly through the image position on the axis of the optical system 27. In order to make a recording on, say the first lengthwise portion of the length of film around the drum the switches 143 and 130 are set to select the brush pairs 144, 145 and 125, 126 which are positioned relatively to the islands 146 and 129 such that the circuits through the brush pairs are closed and opened respectively at the beginning and the end respectively of each passage of the first lengthwise portion of the length of film around the drum through the image position. No exposure of the first lengthwise portion will, however, take place until the ignition initiating circuit of the thyratron is triggered by charging the condenser 141. To make the exposure, the switch 142 is closed to charge the condenser 141, and exposure of the first lengthwise portion then takes place at its next complete passage through the image position. The second and third lengthwise portions are exposed in the same manner after resetting the switches 130, 143, whereafter the film is wound on as previously described.

I claim:

1. Apparatus for recording in wave form an image of a light source which is caused to move rectilinearly as a function of the amplitude of vibrations which are to be recorded, the apparatus comprising a rotatable drum, a stationary optical system for forming a real image of the light source on the periphery of the drum, motive means for rotating the drum so as repeatedly to pass a length of light sensitive strip material carried round the drum periphery lengthwise through the image position at right angles to the direction of displacement of the image resulting from the movement of the light source, control means co-operable with said motive means for selectively controlling the exposure of a length of light sensitive strip material carried round the drum periphery to the light source so that successive recordings may be made upon different lengthwise extending portions of the length of light sensitive strip material each during a different one of the passages of the strip through the image position, first support means within said drum for carrying a supply spool of unexposed light sensitive strip material to be wound on around the periphery of the drum, second support means within said drum for carrying a take-up spool for exposed strip material, balancing means in the drum, movable to maintain the drum in balance, and means for moving the balancing means concurrently with the winding on of the strip material from a supply spool supported by said first support means to a take-up spool supported by said second support means.

2. Apparatus as claimed in claim 1, wherein said balancing means comprises a balance weight movable from a position in which its center of gravity lies on the same diametral line as the center of a supply spool carried by said first support means but on the side of the axis of rotation of the drum remote therefrom to a corresponding position in relation to a take-up spool carried by said second support means, said moving means moving the balance weight uniformly from its first said position to its second said position as strip material is transferred from a supply spool carried by said first support means to a take-up spool carried by said second support means.

3. Apparatus as claimed in claim 2, comprising a winding motor carried by said drum for rotation therewith and operable to wind strip material from a supply spool carried by said first support means round the periphery of the drum and onto a take-up spool carried by said second support means, wherein said moving means comprises a lead screw and a driving connection including reduction gearing drivably connecting the lead screw with said winding motor.

4. Apparatus as claimed in claim 3, wherein said moving means comprises means disengageably engaging said balance weight with said lead screw.

5. Apparatus as claimed in claim 2, comprising a winding motor carried by said drum for driving a take-up spool carried by said second support means, a pair of electric contacts in circuit with the winding motor, and an operating member operable by said balance weight on reaching its second said position to open said contacts and stop the winding motor.

6. Apparatus for recording in wave form an image of a light source which is caused to move rectilinearly as a function of the amplitude of vibrations which are to be recorded, the apparatus comprising a rotatable drum, a stationary optical system for forming a real image of the light source on the periphery of the drum, motive means for rotating the drum so as repeatedly to pass a length of light sensitive strip material carried round the drum periphery lengthwise through the image position at right angles to the direction of displacement of the image resulting from the movement of the light source, and control means co-operable with said motive means for selectively controlling the exposure of a length of light sensitive strip material carried round the drum periphery to the light source so that successive recordings may be made upon different lengthwise extending portions of the length of light sensitive strip material each during a different one of the passages of the strip through the image position, said control means comprising first switch means for connection to be operable to cause the light source to light at the beginning of one of the passages of one of the lengthwise extending portions of the light sensitive strip material, and second switch means for connection to be operable to cause the light source to extinguish at the end of said passage, the first and second switch means each comprising a contact ring mounted for rotation with said drum, and a pair of closely placed brushes mounted in a stationary casing and engaging the contact ring, the contact ring of the first switch means being composed of electrically insulating material having an island of electrically conducting material of a length sufficient to bridge the brushes of the first switch means, and the contact ring of the second switch means being composed of electrically insulating material of a length sufficient to bridge the brushes of the second switch means.

7. Apparatus as claimed in claim 6, wherein said control means comprises first and second switch means for each lengthwise portion of said length of light sensitive strip material on which separate recordings are to be made, and manually operable selector switch means in circuit with all said first and second switch means, said manually operable selector switch means being operable to select any one first and second switch means relating to one lengthwise portion of the length of light sensitive strip material for connection to be operable to cause the light source to light and extinguish respectively.

8. Apparatus as claimed in claim 6, wherein said first switch means is normally open and in series with the ignition initiating control circuit of a thyratron, and said second switch means is normally closed to complete the anode circuit of the thyratron whereby on operation of the first switch means the thyratron becomes conducting and remains conducting until the operation of the second switch means, and wherein the apparatus further comprises source switching means for causing the source to light only when the thyratron is conducting.

9. Apparatus as claimed in claim 8, wherein the source switching means include a grid controlled electronic oscillator valve and biasing means therefor, which biasing means is controlled by the thyratron to control the oscillator valve so that its output is controlled in accordance with whether or not the thyratron is conducting, and wherein the apparatus further comprises a rectifier means for supplying the output of the oscillator valve to the brightness control of a cathode ray tube providing the light source.

10. Apparatus as claimed in claim 8, wherein said ignition initiating circuit includes condenser means chargeable from a source of electric potential when a manually operable switch in circuit with said condenser means is closed, said condenser means, when charged, discharging through said thyratron to ignite it when said first switch means closes.

References Cited in the file of this patent

UNITED STATES PATENTS

| | | |
|---|---|---|
| 2,604,376 | Tuttle et al. | July 22, 1952 |
| 2,633,403 | Spaulding | Mar. 31, 1953 |
| 2,726,919 | Hathaway et al. | Dec. 13, 1955 |
| 2,729,803 | Harrison | Jan. 3, 1956 |